(12) United States Patent
Watanabe et al.

(10) Patent No.: US 7,166,351 B2
(45) Date of Patent: Jan. 23, 2007

(54) FIRE-RETARDANT ANTISTATIC VINYL CHLORIDE RESIN MOLDINGS

(75) Inventors: Kenji Watanabe, Osaka (JP);
Kazuhiro Oritani, Osaka (JP); Osamu Kouzui, Osaka (JP); Takahiro Yokohama, Osaka (JP)

(73) Assignee: Takiron, Co., Ltd., Osaka (JP)

( * ) Notice: Subject to any disclaimer, the term of this patent is extended or adjusted under 35 U.S.C. 154(b) by 0 days.

(21) Appl. No.: 09/964,693

(22) Filed: Sep. 28, 2001

(65) Prior Publication Data

US 2002/0041955 A1    Apr. 11, 2002

(30) Foreign Application Priority Data

Sep. 29, 2000    (JP) ............... P. 2000-302849

(51) Int. Cl.
*B32B 7/02* (2006.01)
*B32B 27/08* (2006.01)

(52) U.S. Cl. ............... 428/212; 428/518; 428/520; 428/299.1

(58) Field of Classification Search ............... 428/518, 428/212, 520, 299.1; 106/18.14, 18.24, 18.26
See application file for complete search history.

(56) References Cited

U.S. PATENT DOCUMENTS

| | | | |
|---|---|---|---|
| 4,219,602 A | 8/1980 | Conklin | |
| 4,431,764 A * | 2/1984 | Yoshizumi | 524/409 |
| 4,680,334 A | 7/1987 | Wallace | |
| 5,036,121 A * | 7/1991 | Coaker et al. | 524/100 |
| 5,073,425 A | 12/1991 | Dees, Jr. et al. | |
| 5,508,343 A * | 4/1996 | Holley | 524/161 |
| 6,316,118 B1 | 11/2001 | Watanabe et al. | |

FOREIGN PATENT DOCUMENTS

| | | |
|---|---|---|
| EP | 0128537 A1 | 12/1984 |
| JP | 11067945 A * | 3/1999 |
| JP | 11353947 A * | 12/1999 |
| JP | 10267360 * | 3/2000 |
| JP | 2000076359 * | 3/2000 |
| JP | 2001192520 * | 7/2001 |

OTHER PUBLICATIONS

Patent Abstracts of Japan—11323051 (Nov. 26, 1999).
Patent Abstracts of Japan—2000080230 (Mar. 21, 2000).
European Search Report dated Jun. 24, 2002.

* cited by examiner

*Primary Examiner*—Kevin R. Kruer
(74) *Attorney, Agent, or Firm*—Sughrue Mion, PLLC

(57) ABSTRACT

Vinyl chloride resin moldings having excellent fire-retardant property, which have good antistatic property and can prevent adhesion of dust. The molding has an antistatic layer containing a conductive material laminated on at least one side of a base layer comprising a vinyl chloride resin, wherein the base layer has a titanium compound; the base layer has a molybdenum compound; the base layer has a vinyl chloride resin having a specific chlorination degree; the base layer has a phosphorus fire-retarding agent and/or a chlorinated polyethylene; etc.

10 Claims, 1 Drawing Sheet

FIRE-RETARDANT ANTISTATIC VINYL CHLORIDE RESIN MOLDINGS

FIELD OF THE INVENTION

This invention relates to antistatic vinyl chloride resin moldings having excellent fire-retarding property.

BACKGROUND OF THE INVENTION

Antistatic synthetic resin plates capable of discharging static electricity and thereby preventing adhesion of dust are used in applications which must avoid dust, such as partitions of a clean room. In addition, as certain semiconductor production apparatus such as a washing vessel and an etching vessel and auxiliary materials for use in their production, such as angles and channels, those which have antistatic property are employed.

Among them, the antistatic synthetic resin plates are produced by laminating a conductive material-containing antistatic layer on the surface of a synthetic resin plate, and various types of thermoplastic resin plates are used as the synthetic resin plates. Particularly, an antistatic vinyl chloride resin plate produced by laminating an antistatic layer on the surface of a vinyl chloride resin plate is frequently used, because the vinyl chloride resin has good moldability and is inexpensive and excellent in terms of mechanical strength and chemical resistance.

However, though these antistatic vinyl chloride resin plates and auxiliary materials made of vinyl chloride resin have fire-retardant property in some degree because of chlorine contained in the vinyl chloride resin itself, they generate smoke and corrosive gases in large amounts due to thermal decomposition of the resin when it causes a fire, so that when these materials such as antistatic vinyl chloride resin plates are used in, e.g., a clean room of semiconductor production factories, air in the factories is polluted with smoke and corrosive gasses generated at the time of a fire, thus causing a danger of polluting and corroding related assets such as production devices, equipment and semiconductor parts.

Because of such circumstances, more higher fire-retardant property is in great demand, and studies are carried out on an antistatic vinyl chloride resin plate which can satisfy this requirement. In order to increase fire-retardant property of the vinyl chloride resin plate, certain means such as inclusion of an inorganic filler in a large amount of approximately from 1.5 to 3 times of the resin content and inclusion of a halogen based fire-retarding agent have mainly been employed, but application of such means has the following problems.

That is, when an inorganic filler is contained in a large amount, not only an antistatic vinyl chloride resin plate having practical strength is difficult to obtain due to brittleness but also a transparent antistatic vinyl chloride resin plate cannot be obtained, and it also causes another problem of reducing chemical resistance of the resin plate.

On the other hand, when a halogen based fire-retarding agent is contained, fire-retardant property of the antistatic vinyl chloride resin plate can be improved but it causes a problem of generating a halogen-containing gas at the time of a fire, and inclusion of a halogen based fire-retarding agent in the transparent resin plate causes a problem of reducing the transparency.

The object of the invention is to provide a plate-shaped or other shape of an antistatic vinyl chloride resin molding having excellent fire-retardant property which can solve these problems.

SUMMARY OF THE INVENTION

In order to achieve the above object, according to a 1st embodiment of the invention, there is provided a fire-retardant antistatic vinyl chloride resin molding, which comprises a vinyl chloride resin molding in which an antistatic layer containing a conductive material is laminated on at least one side of a base layer comprising a vinyl chloride resin, wherein the base layer is a layer containing from 5 to 50 parts by weight of a titanium compound based on 100 parts by weight of the vinyl chloride resin.

The reason why the fire-retardant property is improved when a titanium compound is contained in the base layer vinyl chloride resin could be assumed as follows.

In general, when excess heat is added from the outside to an antistatic vinyl chloride resin molding, chlorine atoms in the vinyl chloride resin are released by the heat and exert fire-retardant action and, at the same time, the resin from which chlorine atoms are released is decomposed by the heat and entails combustion. When the base layer vinyl chloride resin contains a titanium compound such as titanium oxide, the titanium compound is not decomposed up to a high temperature of 1,200 to 1,300° C. in the process of reaching the combustion, because it has a markedly high thermal decomposition temperature and is a powder having high whiteness degree and thermal conductivity, and exerts an action to block heat from the outside (thermal shield action) due to its high brightness, and, during the thermal decomposition and combustion steps of the resin after release of chlorine atoms, it exerts an action to carbonize the resin more quickly (carbonization acceleration action) due to its high heat conductivity. Thus, since the fire-retardant property of the base layer occupying the greater part of the antistatic vinyl chloride resin molding is considerably increased by the thermal shield action and carbonization acceleration action of the titanium compound, the antistatic vinyl chloride resin molding exerts excellent fire-retardant property as a whole.

When the titanium compound content is larger than 50 parts by weight, fire-retardant property of the antistatic vinyl chloride resin molding is further improved but its other properties such as strength and bending processability are decreased. On the other hand, when the titanium compound content is less than 5 parts by weight, the thermal shield action and carbonization acceleration action become insufficient so that it becomes difficult to improve the fire-retardant property.

In this connection, since static electricity is released through the conductive material contained in the antistatic layer, it is needless to say that the antistatic vinyl chloride resin molding can prevent adhesion of dust when charged.

Next, a 2nd embodiment of the invention is a fire-retardant antistatic vinyl chloride resin molding, which comprises a vinyl chloride resin molding in which an antistatic layer containing a conductive material is laminated on at least one side of a base layer comprising a vinyl chloride resin, wherein the base layer is a layer comprised of a vinyl chloride resin having a chlorination degree of from 58 to 73%.

Chlorination degree and fire-retardant property of the vinyl chloride resin have a positive correlation, and the fire-retardant property is improved as the chlorination degree increases. Thus, when the base layer is formed from a vinyl chloride resin having a high chlorination degree of from 58 to 73% like the case of this antistatic vinyl chloride resin molding, the fire-retardant property is improved without including a fire-retarding agent and an inorganic filler. Accordingly, a molding having excellent transparency can be obtained. In addition, because the molding of a vinyl chloride resin having a high chlorination degree has a high heat resistance, it is possible to increase the temperature at which the molding is used.

Formation of the base layer from a vinyl chloride resin having a chlorination degree of less than 58% entails a difficulty in improving the fire-retardant property, while a vinyl chloride resin having a chlorination degree of higher than 73% is not suitable because of inferior properties such as thermal stability, moldability, chemical resistance and corrosion resistance.

In this connection, this antistatic vinyl chloride resin molding can also prevent adhesion of dust by the antistatic layer as a matter of course.

Next, a 3rd embodiment of the invention is a fire-retardant antistatic vinyl chloride resin molding, which comprises a vinyl chloride resin molding in which an antistatic layer containing a conductive material is laminated on at least one side of a base layer comprising a vinyl chloride resin, wherein the base layer is a layer containing from 0.5 to 15 parts by weight of a phosphorus fire-retarding agent or/and from 0.5 to 20 parts by weight of chlorinated polyethylene, based on 100 parts by weight of a vinyl chloride resin having a chlorination degree of less than 58%.

In this antistatic vinyl chloride resin molding, the phosphorus fire-retarding agent undergoes oxidation or thermal decomposition at the time of combustion and thereby forms phosphoric acid, and the phosphoric acid remains on the molding surface to prevent oxygen transfer and also exerts an action to inhibit the combustion by accelerating carbonization of the vinyl chloride resin on the molding surface. On the other hand, the chlorinated polyethylene exerts an action to delay the combustion by generating chlorine gas by its thermal decomposition. Thus, this antistatic vinyl chloride resin molding is excellent in fire-retardant property and becomes a molding having less smoke generation and excellent transparency. Also, when a phosphorus fire-retarding agent and a chlorinated polyethylene are contained in the base layer within the above range, the transparency is improved in comparison with the case of including a halogen based fire-retarding agent.

When the amount of a phosphorus fire-retarding agent and a chlorinated polyethylene is less than 0.5 part by weight, it becomes difficult to sufficiently improve fire-retardant property of the antistatic vinyl chloride resin molding. On the other hand, the fire-retarding agent starts to undergo bleed out when the amount of the phosphorus fire-retarding agent is larger than 15 parts by weight, and the transparency is reduced when the amount of the chlorinated polyethylene is larger than 20 parts by weight.

In this connection, this antistatic vinyl chloride resin molding can also prevent adhesion of dust by the effect of the antistatic layer.

Next, a 4th embodiment of the invention is a fire-retardant antistatic vinyl chloride resin molding, which comprises a vinyl chloride resin molding in which an antistatic layer containing a conductive material is laminated on at least one side of a base layer comprising a vinyl chloride resin, wherein the base layer is a layer containing from 0.1 to 2.5 parts by weight of a molybdenum compound, based on 100 parts by weight of a vinyl chloride resin having a chlorination degree of less than 58%.

According to this antistatic vinyl chloride resin molding, the fire-retardant property is added to the molybdenum compound. When the amount of the molybdenum compound is less than 0.1 part by weight, fire-retardant property of the antistatic vinyl chloride resin molding cannot be improved sufficiently. On the other hand, when the amount of the molybdenum compound is larger than 2.5 parts by weight, there is a danger of causing decomposition in the vinyl chloride resin at the time of molding.

In this connection, this antistatic vinyl chloride resin molding can also prevent adhesion of dust by the antistatic layer.

Next, a 5th embodiment of the invention is a fire-retardant antistatic vinyl chloride resin molding, which comprises a vinyl chloride resin molding in which an antistatic layer containing a conductive material is laminated on at least one side of a base layer comprising a vinyl chloride resin, wherein the base layer is a layer containing from 0.0005 to 10 parts by weight of at least one of a foaming agent, a decomposition accelerator agent, a radical generator agent and a cross-linking agent, based on 100 parts by weight of a vinyl chloride resin having a chlorination degree of less than 58%.

When at least one of a foaming agent, a decomposition accelerator agent, a radical generator agent and a cross-linking agent is contained in the base layer vinyl chloride resin like the case of this antistatic vinyl chloride resin molding, during the process of reaching combustion, the foaming agent foams by its thermal decomposition and thereby exerts an action to intercept heat from the outside, the decomposition accelerator agent exerts an action to quicken carbonization by accelerating decomposition of the vinyl chloride resin, the radical generator agent exerts an action to quicken carbonization by accelerating decomposition of the vinyl chloride resin through generation of radicals and the cross-linking agent exerts an action to inhibit gasification by reacting with polymer molecules of the vinyl chloride resin and thereby increasing the molecular weight, so that the fire-retardant property is improved.

When amount of the foaming agent, decomposition accelerator agent, radical generator agent or cross-linking agent is less than 0.0005 part by weight, it is difficult to increase fire-retardant property of the antistatic vinyl chloride resin molding and, on the other hand, when the amount is contained to larger than 10 parts by weight, further proportionally improved fire-retardant property cannot be obtained so that its a waste of material.

In this connection, this antistatic vinyl chloride resin molding can also prevent adhesion of dust by the antistatic layer.

Since each of the antistatic vinyl chloride resin moldings according to the 2nd, 3rd and 5th embodiments of the invention does not contain an inorganic filler, it does not cause reduction of strength due to brittleness and can be made into a transparent molding if a masking agent such as a pigment is not added. Particularly, the antistatic vinyl chloride resin molding according to the 2nd embodiment of the invention has high fire-retardant property, because the vinyl chloride resin of the base layer has a chlorination degree of from 58 to 73%. Also, the antistatic vinyl chloride resin moldings according to the 3rd, 4th and 5th embodiments of the invention are excellent in chemical resistance and corrosion resistance, because the vinyl chloride resin of the base layer has a chlorination degree of less than 58%. In addition, each of the antistatic vinyl chloride resin moldings according to the 1st embodiments of the invention contains a titanium compound in the base layer, but it hardly causes reduction of strength due to brittleness because of its small amount of from 5 to 50 parts by weight.

Next, a 6th embodiment of the invention is the antistatic vinyl chloride resin molding of any one of the 1st to 5th embodiments, which further comprises an intermediate layer of a vinyl chloride resin having a different composition from that of the base layer, between the base layer and the antistatic layer.

Since compositions of the base layer and intermediate layer are different from each other in this antistatic vinyl chloride resin molding, a composition capable of providing fire-retardant property and mechanical strength can be used in the base layer, and a composition suitable for laminating the antistatic layer can be used in the intermediate layer. Thus, antistatic property can be improved by uniformly coating the antistatic layer while keeping fire-retardant property and mechanical strength of the molding as a whole. Also, since it is possible to employ a production process in which the antistatic layer is laminated on the intermediate layer and then they are laminated on the base layer, various production methods can be selected.

Next, a 7th embodiment of the invention is the antistatic vinyl chloride resin molding of the 6th embodiment, wherein the intermediate layer is a layer which contains from 2 to 30 parts by weight of a titanium compound based on 100 parts by weight of the vinyl chloride resin.

Since the intermediate layer of this antistatic vinyl chloride resin molding contains a titanium compound, fire-retardant property of the intermediate layer is also improved and the molding as a whole has excellent fire-retardant property.

Next, an 8th embodiment of the invention is the antistatic vinyl chloride resin molding of the 6th embodiment, wherein the intermediate layer is a layer which comprises a vinyl chloride resin having a chlorination degree of from 58 to 73%.

Since the intermediate layer of this antistatic vinyl chloride resin molding is formed from a high chlorination degree vinyl chloride resin having excellent fire-retardant property, fire-retardant property of the intermediate layer is also improved and the resin molding exerts excellent fire-retardant property as a whole.

Next, a 9th embodiment of the invention is the antistatic vinyl chloride resin molding of the 6th embodiment, wherein the intermediate layer is a layer which has a thickness of 200 μm or less and comprises a vinyl chloride resin having a chlorination degree of less than 58%.

Since the intermediate layer is formed from a vinyl chloride resin having low chlorination degree, this antistatic vinyl chloride resin molding has good chemical resistance and corrosion resistance. Though such a vinyl chloride resin having a chlorination degree of less than 58% is not good in fire-retardant property, it hardly causes reduction of fire-retardant property of the molding as a whole, because the intermediate layer is formed into a thin thickness of 200 μm or less.

Next, a 10th embodiment of the invention is the antistatic vinyl chloride resin molding of the 6th embodiment, wherein the intermediate layer is a layer which contains from 0.5 to 15 parts by weight of a phosphorus fire-retarding agent or/and from 0.5 to 20 parts by weight of chlorinated polyethylene, based on 100 parts by weight of a vinyl chloride resin having a chlorination degree of less than 58%.

Since the vinyl chloride resin of the intermediate layer is a resin having a chlorination degree of less than 58%, which is excellent in chemical resistance and corrosion resistance, and fire-retardant property of the intermediate layer is increased by the inclusion of a phosphorus fire-retarding agent or/and chlorinated polyethylene, this antistatic vinyl chloride resin molding has excellent fire-retardant property, chemical resistance and corrosion resistance as the whole molding.

Next, a 11th embodiment of the invention is the antistatic vinyl chloride resin molding of the 6th embodiment, wherein the intermediate layer is a layer which contains from 0.1 to 2.5 parts by weight of a molybdenum compound, based on 100 parts by weight of a vinyl chloride resin having a chlorination degree of less than 58%.

Since the intermediate layer is a resin having a chlorination degree of less than 58%, which is excellent in chemical resistance and corrosion resistance, and fire-retardant property of the intermediate layer is increased by a molybdenum compound, this antistatic vinyl chloride resin molding has excellent fire-retardant property, chemical resistance and corrosion resistance as the whole molding.

Next, a 12th embodiment of the invention is the antistatic vinyl chloride resin molding of the 6th embodiment, wherein the intermediate layer is a layer which contains from 0.0005 to 10 parts by weight of at least one of a foaming agent, a decomposition accelerator agent, a radical generator agent and a cross-linking agent, based on 100 parts by weight of a vinyl chloride resin having a chlorination degree of less than 58%.

Since the vinyl chloride resin of the intermediate layer is a resin having a chlorination degree of less than 58%, which is excellent in chemical resistance and corrosion resistance, and fire-retardant property of the intermediate layer is increased by the inclusion of a foaming agent, a decomposition accelerator agent, a radical generator agent or a cross-linking agent, this antistatic vinyl chloride resin molding also has excellent fire-retardant property, chemical resistance and corrosion resistance as the whole molding.

Next, a 13th embodiment of the invention is the antistatic vinyl chloride resin molding of any one of the 1st to 5th embodiments, wherein the antistatic layer is a layer which uses a vinyl chloride resin having a chlorination degree of from 58 to 73% as a binder resin and contains a conductive material.

When the binder resin of the antistatic layer is a vinyl chloride resin having a high chlorination degree like the case of this antistatic vinyl chloride resin molding, fire-retardant property of the antistatic layer is also increased so that fire-retardant property of the whole molding is further improved.

Next, a 14th embodiment of the invention is the antistatic vinyl chloride resin molding of any one of the 1st to 5th embodiments, wherein the antistatic layer is a layer which uses a ultraviolet curing or thermosetting resin as a binder resin and contains a conductive material.

When the binder resin of the antistatic layer is a ultraviolet curing or thermosetting resin like the case of this antistatic vinyl chloride resin molding, surface hardness of the antistatic layer becomes good so that a molding having excellent abrasion resistance can be obtained.

Next, a 15th embodiment of the invention is the antistatic vinyl chloride resin molding of any one of the 1st to 5th embodiments, wherein the conductive material is any one of tin oxide, a conductive titanium oxide and a twisting and entangling ultra thin long carbon fiber.

When any one of these tin oxide, a conductive titanium oxide and an ultra thin long carbon fiber is used in the antistatic layer as the conductive material, static electricity can be released through the conductive material so that adhesion of dust when charged can be prevented securely. Particularly, when tin oxide or an ultra thin long carbon fiber is used, transparency of the antistatic layer is not sharply spoiled so that good transparency of the molding can be maintained as a whole.

DESCRIPTION OF THE REFERENCE NUMERALS

1 Base layer
2 Antistatic layer
2a Conductive material
3 Intermediate layer

DETAILED DESCRIPTION OF THE INVENTION

The following describes illustrative embodiments of the invention in detail.

Figure 1:
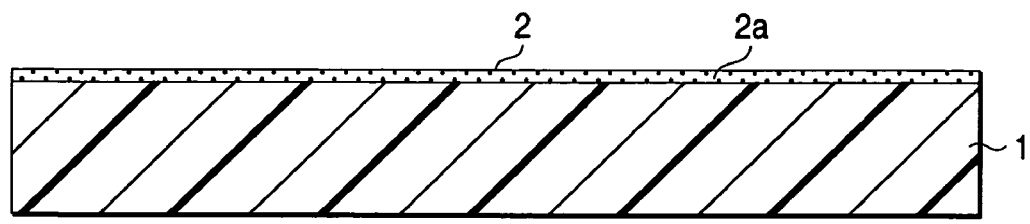
FIG. 1 is a schematic sectional view showing structure of an antistatic vinyl chloride resin molding of the invention.

FIG. 1 is a schematic sectional view showing structure of the plate-shaped antistatic vinyl chloride resin molding of the invention, wherein, as shown in the drawing, the antistatic vinyl chloride resin molding of the invention has a structure in which an antistatic layer 2 containing a conductive material 2a is laminated on at least one side of a base layer 1 comprised of a vinyl chloride resin. In the antistatic vinyl chloride resin molding shown in FIG. 1, the antistatic layer 2 is laminated on only one side of the base layer 1, but the antistatic layer 2 may be laminated on both side of the base layer 1.

Depending on the composition of the base layer 1, the plate-shaped antistatic vinyl chloride resin molding of the invention (to be referred to as antistatic resin plate hereinafter) is roughly divided into the following five antistatic resin plates A, B, C, D and E.

The antistatic resin plate A is a laminated plate in which an antistatic layer 2 containing a conductive material 2a is laminated on at least one side of a base layer 1, wherein the base layer 1 is an opaque layer containing from 5 to 50 parts by weight of titanium oxide based on 100 parts by weight of a vinyl chloride resin.

Examples of the vinyl chloride resin of the base layer 1 include (a) a general vinyl chloride resin having a chlorination degree of about 56%, (b) an after-chlorinated vinyl chloride resin having a chlorination degree of 57% or more, preferably from 58 to 73%, more preferably from 60 to 67%, (c) a resin obtained by mixing these vinyl chloride resins, (d) a resin obtained by mixing these vinyl chloride resins with other resin such as a vinyl acetate resin or an acrylic resin and (e) a copolymer resin of vinyl chloride with vinyl acetate or ethylene.

The general vinyl chloride resin of (a) is particularly effective when a base layer 1 having excellent chemical resistance is formed, the after-chlorinated vinyl chloride resin of (b) is particularly effective when a base layer 1 having excellent fire-retardant property is formed, the mixed resin of (c) is particularly effective when a base layer 1 having good balance of chemical resistance and fire-retardant property is formed, and the mixed resin of (d) and copolymer resin of (e) are particularly effective when a base layer 1 whose physical properties such as moldability and bending processability are improved is formed. In the case of the resins of (c), (d) and (e), it is necessary to keep fire-retardant property by mixing or copolymerizing respective components to control the average chlorination degree at a level of from 50 to 73%. In this connection, as will be described later, the resins of (a) to (e) are used in many cases by properly using those which have a chlorination degree of 58% or more (preferably, from 58 to 73%) having excellent fire-retardant property and those which have a chlorination degree of less than 58% (50% or more and less than 58%) having excellent chemical resistance.

As the titanium compound to be contained in the vinyl chloride resin of the base layer 1, a compound such as titanium oxide or potassium titanate is used, and a powder having an average particle size of approximately from 0.1 to 0.5 μm is used particularly desirably. Since a powder of titanium oxide or potassium titanate having such an average particle size has good mixing ability with vinyl chloride resins, it can be contained under a uniformly suspended condition. Also, titanium oxide whose surface is coated with alumina is markedly desirably used, because carbonization of the vinyl chloride resin is further accelerated by the synergistic action of titanium oxide and alumina, and smoke and gasses are adsorbed by alumina, at the time of combustion.

When the titanium compound is present in the vinyl chloride resin of base layer 1, the titanium compound exerts thermal shield action and carbonization acceleration action during the process of reaching combustion as already described, so that fire-retardant property of the base layer 1 which occupies the greater part of the antistatic resin plate is considerably improved and, as a result, the antistatic resin plate A exerts excellent fire-retardant property as a whole.

It is necessary that the amount of the titanium compound is within the range of from 5 to 50 parts by weight based on 100 parts by weight of the vinyl chloride resin, because when the amount exceeds 50 parts by weight, fire-retardant property of the antistatic resin plate A is further improved but its physical properties such as strength and bending processability are reduced. On the other hand, when the titanium compound content is less than 5 parts by weight, it becomes difficult to improve fire-retardant property due to insufficient thermal shield action and carbonization acceleration action. More preferred amount of the titanium compound is from 8 to 30 parts by weight, because fire-retardant property and physical properties can be obtained at the same time within this range.

Also, this base layer 1 is optionally blended with various additives necessary for molding, such as a stabilizer, a lubricant, a processing aid and a reinforcing agent. Since this base layer 1 becomes whitish opaque by the inclusion of a titanium compound, the stabilizer such as a lead based or tin based stabilizer, is not particularly limited but a lead based stabilizer which is excellent in thermal stability is desirably blended and, when the base layer 1 is made into a transparent form like the case of the antistatic resin plates B, C and E which will be described later, a tin based stabilizer (a stabilizer of a dibutyltin maleate based or dibutyltin laurate based) is blended. Also, a material such as a higher fatty acid or low molecular weight polyethylene is blended as the lubricant, a material such as an acrylic processing aid is blended as the processing aid and a material such as an MBS type reinforcing agent is blended as the reinforcing agent.

In this connection, since the antistatic layer 2 of this antistatic resin plate A is identical to the antistatic layer 2 of the antistatic resin plates B, C, D and E which will be described later, the antistatic layer 2 is described later as a whole.

Next, the antistatic resin plate B is a laminated plate in which an antistatic layer 2 containing a conductive material 2a is laminated on at least one side of a base layer 1, wherein the base layer 1 is a layer comprised of a vinyl chloride resin having a chlorination degree of from 58 to 73%.

As already described, chlorination degree and fire-retardant property of the vinyl chloride resin have a positive correlation, and a vinyl chloride resin having a high chlorination degree of from 58 to 73% is excellent in fire-retardant property, so that when the base layer 1 which occupies the greater part of the antistatic resin plate B is formed from such a high chlorination degree vinyl chloride resin, fire-retardant property of the base layer 1 is improved without blending a fire-retarding agent and a large amount of an inorganic filler and, as a result, the antistatic resin plate B exerts excellent fire-retardant property as a whole.

As the vinyl chloride resin having a chlorination degree of from 58 to 73%, the after-chlorinated vinyl chloride resin of (b) having a chlorination degree of from 58 to 73% (preferably 60 to 67%, more preferably 64 to 65%) and the vinyl chloride mixed resin and copolymer resin of (c), (d) and (e) produced by mixing or copolymerizing respective components to control the average chlorination degree at a level of from 58 to 73% are used. The antistatic resin plate B using such a resin can increase the temperature at which it deforms and thus it can be applied to the use at a high temperature.

Since fire-retardant property of the general vinyl chloride resin having a chlorination degree of about 56% and the vinyl chloride mixed resin and copolymer resin of (c), (d) and (e) produced by mixing or copolymerizing respective components to control the average chlorination degree at less than 58% is not so good, improvement of fire-retardant property of the antistatic resin plate B becomes difficult when the base layer 1 is formed from such resins. Also, a vinyl chloride resin having a chlorination degree of higher than 73% is not desirable, because production of the plate is not easy and if produced, its properties such as thermal stability, moldability, chemical resistance and corrosion resistance are poor.

In this connection, it is needless to say that the base layer 1 of this antistatic resin plate B is also optionally blended with various additives necessary for molding, such as a stabilizer (e.g., a tin based stabilizer when transparent base layer 1 is desired), a lubricant, a processing aid and a reinforcing agent. Particularly, it is desirable to use an after-chlorinated vinyl chloride resin blended with additives which do not inhibit transparency, such as a tin based stabilizer, a lubricant, a processing aid, a reinforcing agent and a pigment, without adding an inorganic filler such as calcium carbonate and titanium oxide, in order to obtain a transparent base layer 1 which is required for obtaining a transparent antistatic resin plate B.

Next, the antistatic resin plate C is a laminated plate in which an antistatic layer 2 containing a conductive material 2a is laminated on at least one side of a base layer 1, wherein the base layer 1 is a layer containing from 0.5 to 15 parts by weight of a phosphorus fire-retarding agent or/and from 0.5 to 20 parts by weight of chlorinated polyethylene, based on 100 parts by weight of a vinyl chloride resin having a chlorination degree of less than 58%.

As the vinyl chloride resin having a chlorination degree of less than 58%, the general vinyl chloride resin of (a) having a chlorination degree of about 56% and the vinyl chloride mixed resin and copolymer resin of (c), (d) and (e) produced by mixing or copolymerizing respective components to control the average chlorination degree at a level of from 50% or more to less than 58% are used. Since these vinyl chloride resins having not so high chlorination degree, particularly a general vinyl chloride resin having a chlorination degree of about 56%, have excellent processability, chemical resistance and corrosion resistance, an antistatic resin plate C having excellent properties such as processability and chemical resistance can be obtained.

As the phosphorus fire-retarding agent to be used as a component of the vinyl chloride resin of this base layer 1, an organic phosphorus compound such as a halogen-containing phosphoric ester, a halogen-containing condensed phosphoric ester, a non-halogen phosphoric ester, a non-halogen condensed phosphoric ester or an orthophosphoric ester is suitable, and its preferred examples include tris(chloroethyl) phosphate, tris(chloropropyl) phosphate, tris(dichloropropyl) phosphate, trimethyl phosphate, triphenyl phosphate, tricresyl phosphate, cresylphenyl phosphate and 2-ethylhexyldiphenyl phosphate.

Since such organic phosphorous-based fire-retarding agents are excellent in transparency in comparison with halogen-based fire-retarding agents and other fire-retarding agents such as of antimony oxide, they are advantageous in obtaining a transparent antistatic resin plate C. Also, as already described, this organic phosphorus-based fire-retarding agent forms phosphoric acid by its thermal decomposition at the time of combustion and thereby prevents oxygen transfer and also inhibits the combustion by accelerating carbonization on the surface, so that even if the vinyl chloride resin of the base layer 1 is a resin of less than 58% in chlorination degree having not so good fire-retardant property, fire-retardant property of the antistatic resin plate C can be improved. In addition, since this organic phosphoric acid ester also acts as an internal lubricant or external lubricant, there is an advantage in that other lubricants such as of higher fatty acids are not necessary. In this connection, an inorganic phosphorus-based fire-retarding agent such as red phosphorus can also be used.

On the other hand, the chlorinated polyethylene to be contained in the vinyl chloride resin of base layer 1 also acts as a reinforcing agent, and a chlorinated polyethylene having a chlorination degree of from 25 to 45% is suitably used. When such a chlorinated polyethylene is contained, chlorine gas generated by its thermal decomposition delays combustion of the resin as already described, so that even if the vinyl chloride resin of the base layer 1 is a resin of less than 58% in chlorination degree having not so good fire-retardant property, fire-retardant property of the antistatic resin plate C can be improved. A chlorinated polyethylene having a chlorination degree of less than 25% is not advantageous for improving fire-retardant property due to the small chlorine gas generation, and a chlorinated polyethylene having a chlorination degree of more than 45% is not desirable because of an inconvenience that its reinforcing effect is hardly improved.

The phosphorus fire-retarding agent should be contained in an amount of from 0.5 to 15 parts by weight based on 100 parts by weight of the vinyl chloride resin of base layer 1, and the chlorinated polyethylene should be contained in an amount of from 0.5 to 20 parts by weight. When the amount of the phosphorus fire-retarding agent or/and chlorinated polyethylene is less than 0.5 part by weight, it is difficult to sufficiently improve fire-retardant property of the antistatic resin plate C. On the other hand, when the amount of the phosphorus fire-retarding agent is larger than 15 parts by weight, the phosphorus fire-retarding agent is apt to undergo bleed out, and when the amount of the chlorinated polyethylene is larger than 20 parts by weight, transparency of the base layer 1 is reduced. Preferred amount of the phosphorus fire-retarding agent to be contained is from 2 to 10 parts by weight, and preferred amount of the chlorinated polyethylene to be contained is from 3 to 15 parts by weight.

In this connection, the base layer 1 of this antistatic resin plate C is also optionally blended with various additives necessary for molding, such as a stabilizer (e.g., a tin based stabilizer when transparent base layer 1 is desired), a lubricant, a processing aid and a reinforcing agent, but the lubricant can be omitted when the phosphorus fire-retarding agent is contained.

Next, the antistatic resin plate D is a laminated plate in which an antistatic layer 2 containing a conductive material 2a is laminated on at least one side of a base layer 1, wherein the base layer 1 is a layer containing from 0.1 to 2.5 parts by weight of a molybdenum compound, based on 100 parts by weight of a vinyl chloride resin having a chlorination degree of less than 58%.

As the molybdenum compound, molybdenum oxide, calcium zinc molybdate, zinc molybdate, ammonium molybdate, potassium molybdate or molybdenum disulfide is suitably used.

It is necessary to use the molybdenum compound in an amount of less than 2.5 parts by weight based on 100 parts by weight of the vinyl chloride resin, because when the molybdenum compound is blended in a large amount, it decomposes the vinyl chloride resin to generate black spots at the time of molding. On the other hand, it is necessary to use the molybdenum compound in an amount of larger than 0.1 part by weight, because when blending amount of the molybdenum compound too small, its action as the fire-retarding agent is reduced. Preferably, the amount of molybdenum compound is from 0.2 to 2.0 part by weight, based on 100 parts by weight of a vinyl chloride resin having a chlorination degree of less than 58%. As the amount of molybdenum contained in the molybdenum compound, this range is from 0.05 to 1.5 parts by weight, preferably from 0.1 to 1.0 part by weight.

Regarding particle size of the molybdenum compound, a range of from 0.5 to 7 µm, preferably from 1.0 to 5.0 µm, is used. The particle sized within this range is desirable in improving fire-retardant property due to its good uniform dispersing ability in the vinyl chloride resin.

A molybdenum compound uniformly mixed with the other additives in advance or coated with the additives or the additives coated with a molybdenum compound can also be used, and these compounds have good dispersing ability.

In addition, it is preferable to further add a titanium compound in an amount of 2 to 30 parts by weight based on 100 parts by weight of the vinyl chloride resin of the base layer in the antistatic vinyl resin molding. By adding the molybdenum compound and the titanium compound in combination into the base layer, the thermal conductivity of the titanium compound and the acceleration of decomposition by the molybdenum compound function synergistically and thus it is possible to obtain a resin plate having further improved fire-retarding property. Examples of the titanium compound include a titanium oxide or potassium titanate power having an average particle size of approximately from 0.1 to 0.5 µm as described above. The titanium compound when used in an amount of less than 2 parts by weight may not sufficiently show the synergistic effect and the titanium compound when used in an amount of more than 30 parts by weight may not further increase the synergistic effect.

In this connection, the base layer 1 of this antistatic resin plate D is also optionally blended with various additives necessary for molding, such as a stabilizer, a lubricant, a processing aid and a reinforcing agent.

Next, the antistatic resin plate E is a laminated plate in which an antistatic layer 2 containing a conductive material 2a is laminated on at least one side of a base layer 1, wherein the base layer 1 is a layer containing from 0.0005 to 10 parts by weight of at least one of a foaming agent, a decomposition accelerator agent, a radical generator agent and a cross-linking agent (hereinafter, these substances are called fire-retardant property providing components as a whole), based on 100 parts by weight of a vinyl chloride resin having a chlorination degree of less than 58%.

As the vinyl chloride resin having a chlorination degree of less than 58% which forms the base layer 1, the same vinyl chloride resin having a chlorination degree of less than 58% for use in the base layer formation of the antistatic resin plate C is used.

Regarding the foaming agent as one of the fire-retardant property providing components, compounds such as azodicarbonamide, azobisisobutyronitrile, dinitropentamethylenetetramine, a hydrazide compound (e.g., p-toluenesulfonyl hydrazide or 4,4'-oxybisbenzenesulfonyl hydrazide) and a mixture of an inorganic carbonate with an organic acid are desirably used, and particularly those which start foaming at a temperature of 200° C. or more which is higher than the mold processing temperature of the vinyl chloride resin are suited.

The antistatic resin plate E in which a foaming agent which starts foaming at a temperature of 200° C. or more is contained in the base layer 1 hardly foams at the time of molding and bending processing, and when the plate E is heated to the foaming temperature or more at the time of a fire, the foaming agent foams by its thermal decomposition and thereby exerts excellent thermal shield action as already described, so that fire-retardant property of the antistatic resin plate E is sharply improved. In addition, since smoke and corrosive gasses are incorporated into the resulting bubbles, generated amounts of smoke and corrosive gasses are also reduced.

Regarding the decomposition accelerator agent as one of the fire-retardant property providing components, compounds such as a zinc compound (e.g., a zinc soap such as zinc laurate, zinc stearate or zinc benzoate), an amine compound (e.g., melamine or triethylamine) and iron hydroxide are desirably used, and particularly those which accelerate decomposition of the vinyl chloride resin at a temperature of 200° C. or more which is higher than the mold processing temperature of the vinyl chloride resin are suited.

The antistatic resin plate E in which a decomposition accelerator agent which starts decomposition acceleration at a temperature of 200° C. or more is contained in the base layer 1 hardly causes decomposition of the vinyl chloride resin effected by the decomposition accelerator agent at the time of molding and bending processing and, during the process of reaching combustion at the time of a fire, decomposition of the vinyl chloride resin is accelerated and its carbonization is quickened by the decomposition accelerator agent as already described, so that fire-retardant property of the antistatic resin plate E is sharply improved.

Regarding the radical generator agent as one of the fire-retardant property providing components, peroxides such as diamyl peroxide, peroxydicarbonate, dialkyl peroxide and hydroperoxide and perchlorates are desirably used, and particularly those which generate radicals at a temperature of 200° C. or more which is higher than the mold processing temperature of the vinyl chloride resin are suited.

The antistatic resin plate E in which a radical generator agent which acts at a temperature of 200° C. or more is contained in the base layer 1 is rear in causing a danger of deterioration due to less generation of radicals at the time of molding and bending processing and, during the process of reaching combustion at the time of a fire, the radicals generated by the radical generator agent accelerate decomposition of the vinyl chloride resin and quicken its carbonization, so that fire-retardant property of the antistatic resin plate E is sharply improved.

Regarding the cross-linking agent as one of the fire-retardant property providing components, compounds such as a triazine thiol compound are desirably used, and particularly those which start cross-linking at a temperature of 200° C. or more which is higher than the mold processing temperature of the vinyl chloride resin are suited.

The antistatic resin plate E in which a cross-linking agent which acts at a temperature of 200° C. or more is contained in the base layer 1 hardly generates cross-linking reaction at the time of molding and bending processing but, as already described, during the process of reaching combustion at the time of a fire, molecular weight of polymer molecules of the vinyl chloride resin is increased by the cross-linking reaction, thereby effecting increase in heat resistance and difficulty in causing gasification, so that fire-retardant property of the antistatic resin plate E is sharply improved.

It is necessary that the fire-retardant property providing components are contained in an amount of from 0.0005 to 10 parts by weight based on 100 parts by weight of the vinyl chloride resin of base layer 1, because it becomes difficult to sufficiently increase fire-retardant property of the antistatic resin plate E if the content is less than 0.0005 part by weight. On the other hand, when the content is increased to larger than 10 parts by weight, further proportionally improved fire-retardant property cannot be obtained so that its a waste of material. Preferred amount of the fire-retardant property providing components is from 0.05 to 5 parts by weight.

In this connection, the base layer 1 of this antistatic resin plate E is also optionally blended with various additives necessary for molding, such as a stabilizer (e.g., a tin based stabilizer when transparent base layer 1 is desired), a lubricant, a processing aid and a reinforcing agent.

Each of the antistatic resin plates B, C and E does not cause reduction of strength by becoming brittle due to the absence of inorganic fillers in the base layer 1 and shows a good transparency of 40% or more in total light transmittance and 60% or less in haze value, if a tin based stabilizer is used but a masking agent such as a pigment is not contained. On the other hand, the antistatic resin plates A contain a titanium compound in the base layer 1 but in a small amount of from 5 to 50 parts by weight so that sharp reduction of strength does not occur. In addition, the antistatic resin plate B has good fire-retardant property, because the vinyl chloride resin of base layer 1 has a chlorination degree of from 58 to 73%, and the antistatic resin plates C, D and E have good processability, chemical resistance and corrosion resistance, because the vinyl chloride resin of base layer 1 has a chlorination degree of less than 58%.

In this connection, thickness of the antistatic resin plates A, B, C, D and E is not particularly limited and a thickness from which a practical strength can be obtained is selected in response to each use, but it is generally suitable to set the thickness within the range of approximately from 1 to 15 mm.

Next, the antistatic layer 2 of the antistatic resin plates A, B, C, D and E is described.

This antistatic layer 2 is a layer in which a conductive material 2a is contained in a binder resin in such an amount that the surface resistivity becomes $10^{10}$ Ω/□ or less, preferably from $10^6$ to $10^8$ Ω/□, and any one of the vinyl chloride resins (a) to (e) to be used in the base layer 1, particularly a vinyl chloride resin having a chlorination degree of from 58 to 73%, preferably an after-chlorinated vinyl chloride resin having a chlorination degree of from 60 to 67%, more preferably about 64% to 65%, is desirably used as the binder resin. When such a high chlorination degree vinyl chloride resin is used, fire-retardant property of the antistatic layer 2 is increased so that fire-retardant property of the antistatic resin plate is further improved as a whole. However, the vinyl chloride resin having a chlorination degree of less than 58% (preferably about 56%) also has a sufficient fire-retardant property as the antistatic resin plate, because the thickness of the antistatic layer 2 is thin. The antistatic layer 2 may be laminated on the base layer 1 directly or via an intermediate layer which will be described later.

Also, it is possible to use a resin other than the vinyl chloride resin, such as an ultraviolet curing resin (e.g., an acrylic resin or an unsaturated polyester resin) or a thermosetting resin (e.g., an epoxy resin or a phenol resin), as the binder resin of the antistatic layer 2, and an antistatic layer in which a conductive material is contained in such an ultraviolet curing resin shows improved surface hardness and hardly causes fallout of the conductive material so that an antistatic resin plate having good surface hardness and long-term antistatic property can be obtained. Also, an antistatic resin plate having a hard antistatic layer 2 can be produced by preparing a coating solution containing an ultraviolet curing or thermosetting resin and a conductive material, coating the solution on a plate-shaped base layer 1 by a known coating method such as gravure printing, flow coater coating or spray coating, and then curing the layer by ultraviolet ray irradiation or heating. Also, the antistatic layer 2 can be formed on the base layer 1 of not only a plate-shape but also other shapes of moldings such as an angle, a channel and a rod by coating the solution with a method such as spraying and curing the layer, so that there is an advantage in that an antistatic resin molding can be obtained regardless of the shape of the base layer 1.

Regarding the conductive material 2a to be contained in the antistatic layer 2, conventionally known various conductive materials can be used, but particularly, tin oxide, a twisting and entangling ultra thin long carbon fiber and a conductive titanium oxide are suitably used. Among them, unlike the case of carbon powder, tin oxide and a long carbon fiber do not sharply spoil transparency of the antistatic layer 2 and can maintain good transparency of the antistatic resin plate. Particularly, the long carbon fiber entangles almost uniformly when contained in the antistatic layer 2, so that irregularity in surface resistivity of the antistatic layer 2 is small, excellent antistatic property can be exerted by containing it only in a small amount and the antistatic property can be maintained without loosing its entanglement when the antistatic resin plate is subjected to a secondary processing. Also, since an antistatic layer 2 containing a conductive titanium oxide is apt to become opaque, it is desirable to use it when an opaque antistatic resin plate is produced.

As the tin oxide, its powder having an average particle size of approximately from 0.1 to 0.6 μm is suitable, and such a powder of tin oxide has good mixing ability with the binder resin so that they can be uniformly mixed. In addition, a tin oxide containing antimony can also be used.

On the other hand, the long carbon fiber is an ultra thin and twisted long fiber having a large aspect ratio and a small fiber diameter, and it may be an amorphous carbonaceous fiber or a graphite fiber, or a carbon fiber in which amorphous carbon and graphite coexist in the fiber. Particularly suitable long carbon fiber is an ultra thin and long graphite fiber having a circular section, which is a graphite fiber in view of its structure in which a graphite layer is formed by laminating it on the fiber axis in coaxial direction, having a fiber diameter of from 3.5 to 100 nm and an aspect ratio of 5 or more. The aspect ratio has no upper limitation but 3000 or less is suitable.

Also, the conductive titanium oxide is produced by coating the surface of titanium oxide having various shapes such as sphere, scale and needle-like shapes with antimony-doped tin oxide, and a needle shape conductive titanium oxide is suitably used because of the large mutual contact frequency.

Tin oxide and long carbon fiber as the conductive material $2a$ should be used in such amounts that surface resistivity of the antistatic layer 2 becomes $10^{10}$ Ω/□ or less, preferably $10^6$ to $10^8$ Ω/□, and transparency of the antistatic layer 2 is not sharply reduced, and it is desirable to contain in an amount of from 100 to 300 parts by weight in the case of tin oxide powder, or from 2 to 10 parts by weight in the case of long carbon fiber, based on 100 parts by weight of the binder resin. Also, it is desirable to use the conductive titanium oxide as the conductive material $2a$ in an amount of from 15 to 30 parts by weight so that the surface resistivity becomes $10^{10}$ Ω/□ or less, preferably $10^6$ to $10^8$ Ω/□. When the amount of tin oxide, long carbon fiber or conductive titanium oxide is less than the respective range, surface resistivity of the antistatic layer 2 exceeds $10^{10}$ Ω/□ to cause reduction of antistatic property and, on the other hand, increase in the amount exceeding the respective range is not effective in decreasing the surface resistivity but rather causes reduction of transparency of the antistatic layer 2.

It is desirable that thickness of the antistatic layer 2 is approximately from 0.3 to 1.5 μm when the conductive material $2a$ is tin oxide or conductive titanium oxide, or from 0.1 to 1.0 μm in the case of the long carbon fiber. The thickness thinner than this causes reduction of antistatic property due to increased surface resistivity and thicker than this is not effective in decreasing the surface resistivity but rather will cause reduction of transparency. Thus, since thickness of the antistatic layer 2 is markedly thin, when other resin than the vinyl chloride resin having excellent fire-retardant property, such as an ultraviolet curing or thermosetting resin, is used as the binder resin, the resulting molding has also fire-retardant property as a whole.

In the antistatic resin plates A, B, C, D and E in which an antistatic layer 2 is formed on a base layer 1, static electricity is released through a conductive material $2a$, such as tin oxide, a long carbon fiber or a conductive titanium oxide, of the antistatic layer 2, so that adhesion of dust by charging can be prevented.

Since the antistatic resin plates A, B, C, D and E have excellent transparency, except for the antistatic resin plate A which contains a titanium compound in the base layer 1 and D which contains a molybdenum compound in the base layer, the total light transmittance can be controlled at 40% or more, and the haze value at 60% or less, when the total thickness is 3 mm. More preferably, the base layer 1 and antistatic layer 2 are properly selected so that a light transmittance of from 60 to 85% and a haze value of from 1 to 10% can be obtained.

Next, methods for the production of the antistatic resin plates A, B, C, D and E are briefly described.

Firstly, vinyl chloride resin compositions for use in the formation of the base layers of the antistatic resin plates A, B, C, D and E are respectively prepared by selectively blending a vinyl chloride resin having a chlorination degree of less than 58% or from 58 to 73% with a titanium compound, a phosphorus fire-retarding agent, a chlorinated polyethylene, molybdenum compound, fire-retardant providing components and various additives, and then each of these compositions is formed into a plate by extrusion molding, calender press or other means. Subsequently, the antistatic resin plates A, B, C, D and E are produced by coating the plate with an antistatic layer-forming coating solution prepared by mixing a binder resin with a conductive material $2a$, and then forming an antistatic layer 2 by drying and solidifying the coated layer (spontaneous or/and heat hardening when the binder resin is a vinyl chloride resin, ultraviolet curing when it is an ultraviolet curing resin or heat curing when it is a thermosetting resin).

Regarding another production method, while preparing the vinyl chloride resin composition for use in the formation of base layer, the antistatic layer-forming coating solution is coated on a release film such as a polyester film and hardened, and an adhesive layer (e.g., an acrylic resin adhesive layer) is arranged as occasion demands. Then, the antistatic resin plates A, B, C, D and E can also be produced by, when extrusion molding or calender press is carried out using the respective vinyl chloride resin compositions, employing a transfer method in which the antistatic layer-attached release film is integrated into one body by extrusion laminating process or simultaneous press and then the release film is peeled off.

In that case, an antistatic resin plate containing from 2 to 30 parts by weight of a chlorine capturing compound in the base layer 1 may be produced by further mixing the vinyl chloride resin composition for use in the formation of base layer with selectively a chlorine capturing compound (e.g., a carbonate such as calcium carbonate or magnesium carbonate). When a chlorine capturing compound is contained, chlorine is captured by the chlorine capturing compound at the time of combustion, so that it exerts an advantage of reducing the amount of generated corrosive gasses such as chlorine gas and hydrogen chloride gas.

A case in which the molding has a plate shape has been described in the above embodiment, but when the base layer of a molding has a different shape such as an angle shape, a channel shape or a rod shape or a vessel shape prepared by combining them, antistatic resin moldings of other shapes than the plate shape can be obtained by coating an antistatic layer-forming coating solution on these base layers (e.g., by a spraying process) and drying and solidifying (hardening, curing) the coated layer to form an antistatic layer.

Figure 2:
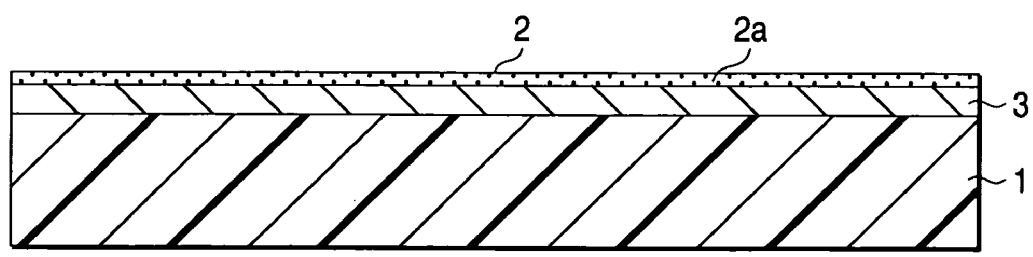
FIG. 2 is a schematic sectional view showing structure of another antistatic vinyl chloride resin molding of the invention.

FIG. 2 is a schematic sectional view showing structure of another plate-shaped antistatic vinyl chloride resin molding (antistatic resin plate) of the invention and, as shown in the drawing, this antistatic resin plate has a structure in which an intermediate layer 3 of a vinyl chloride resin having a different composition from that of a base layer 1 is arranged between the base layer 1 and an antistatic layer 2. In the antistatic resin plate shown in FIG. 2, the intermediate layer 3 is arranged between the base layer 1 and the antistatic layer 2 on its one side so that form a three layer structure laminated plate, but a five layer structure laminated plate may be formed by arranging each intermediate layers between the base layer and antistatic layers on its both sides.

Since the base layer 1 and antistatic layer 2 of this antistatic resin plate are identical to the base layer 1 and antistatic layer 2 of the antistatic resin plate described in the foregoing, their description is omitted.

The intermediate layer 3 is a layer comprised of a vinyl chloride resin having a different composition from that of the base layer 1 as described above, which, illustratively, is formed into any one of (1) a layer containing from 2 to 30 parts by weight of a titanium compound based on 100 parts by weight of a vinyl chloride resin, (2) a layer comprised of a vinyl chloride resin having a chlorination degree of from 58 to 73%, preferably an after-chlorinated vinyl chloride resin having a chlorination degree of from 60 to 67%, (3) a layer having a thickness of 200 μm or less, comprised of a vinyl chloride resin having a chlorination degree of less than 58%, (4) a layer containing from 0.5 to 15 parts by weight of a phosphorus fire-retarding agent or/and from 0.5 to 20 parts by weight of a chlorinated polyethylene, based on 100 parts by weight of a vinyl chloride resin having a chlorination degree of less than 58%, (5) a layer containing from 0.1 to 2.5 parts by weight of a molybdenum compound (preferably further containing from 2 to 30 parts by weight of a titanium compound), based on 100 parts by weight of a vinyl chloride resin having a chlorination degree of less than 58%, and (6) a layer containing from 0.0005 to 10 parts by weight of at least one of the fire-retardant providing components, based on 100 parts by weight of a vinyl chloride resin having a chlorination degree of less than 58%, and arranged in combination with the base layer 1 having a different composition. In this case, the term "different composition" means not only a case in which resins are different as a matter of course but also a case in which formulation compositions are different even if the same resin is used, and another case in which the base layer 1 is the after-chlorinated vinyl chloride resin of (b) and the intermediate layer 3 is the after-chlorinated vinyl chloride resin of (2) is also included in the "different composition" when amounts of additives such as a stabilizer, a lubricant, a processing aid and a reinforcing agent to be formulated therein are different.

The vinyl chloride resin of (1) which forms the intermediate layer 3 is identical to the resin to be used in the formation of the base layer 1 of the antistatic resin plate A, the vinyl chloride resin of (2) having a chlorination degree of from 58 to 73% is identical to the vinyl chloride resin having a chlorination degree of from 58 to 73% to be used in the formation of the base layer 1 of the antistatic resin plate B, and the vinyl chloride resins of (3), (4), (5) and (6) having a chlorination degree of less than 58% are identical to the vinyl chloride resin having a chlorination degree of less than 58% to be used in the formation of the base layer 1 of the antistatic resin plates C, D and E.

Also, the titanium compound to be contained in the intermediate layer of (1) may be identical to the titanium compound in the base layer 1 of the antistatic resin plate A, the phosphorus fire-retarding agent and chlorinated polyethylene to be contained in the intermediate layer of (4) are identical to the phosphorus fire-retarding agent and chlorinated polyethylene to be contained in the base layer 1 of the antistatic resin plate C, the molybdenum compound and titanium compound to be contained in the intermediate layer of (5) are identical to the molybdenum compound and titanium compound to be contained in the base layer 1 of the antistatic resin plate D, and the fire-retardant providing components to be contained in the intermediate layer of (6) are identical to the foaming agent, decomposition accelerator agent, radical generator agent and cross-linking agent to be contained as fire-retardant providing components in the base layer 1 of the antistatic resin plate E.

When the intermediate layer 3 to be arranged between the base layer 1 and antistatic layer 2 is the layer of (1), it exerts excellent fire-retardant property and the fire-retardant property of the resulting resin plate is improved as a whole, because it is a vinyl chloride resin containing a titanium compound.

Also, when the intermediate layer 3 is the layer of (2), fire-retardant property of the resin plate is improved as a whole, because the base layer 1 is covered with the vinyl chloride resin of the intermediate layer 3 having a high chlorination degree of from 58 to 73% and good heat resistance.

Also, when the intermediate layer 3 is the layer of (3), an antistatic resin plate which is hardly spoiled by chemical solutions and corrosive gasses is obtained, because the intermediate layer 3 has excellent chemical resistance and corrosion resistance due to the vinyl chloride resin having a chlorination degree of less than 58%. In this connection, the intermediate layer comprised of a vinyl chloride resin having a chlorination degree of less than 58% is not so good in fire-retardant property, but since it is formed into a thin thickness of 200 μm or less and the ratio of the intermediate layer occupying the whole resin plate is small, there is almost no danger of causing substantial reduction of fire-retardant property as the whole resin plate.

Also, when the intermediate layer 3 is the layer of (4), good chemical resistance and corrosion resistance are exerted by the vinyl chloride resin having a chlorination degree of less than 58% and fire-retardant property of the intermediate layer is also improved by the phosphorus fire-retarding agent and chlorinated polyethylene, so that an antistatic resin plate having excellent fire-retardant property, chemical resistance and corrosion resistance is obtained. Amount of the phosphorus fire-retarding agent in the intermediate layer 3 should be controlled within the range of from 0.5 to 15 parts by weight based on 100 parts by weight of the vinyl chloride resin similar to the case of the base layer 1, and amount of the chlorinated polyethylene should also be controlled within the range of from 0.5 to 20 parts by weight similar to the case of the base layer. The reason for this was already described and therefore is omitted.

Also, when the intermediate layer is the layer of (5), it exerts excellent chemical resistance and corrosion resistance by the vinyl chloride resin having a chlorination degree of less than 58% and fire-retardant property of the intermediate layer is also improved by the molybdenum compound, so that an antistatic resin plate having excellent fire-retardant property, chemical resistance and corrosion resistance is obtained. Regarding the molybdenum compound to be contained in the intermediate layer, as already described, they synergistically exert fire-retardant property when the molybdenum compound is contained in an amount of from 0.1 to 2.5 parts by weight, based on 100 parts by weight of the vinyl chloride resin.

It is preferable to add a titanium compound in an amount of 2 to 30 parts by weight in the intermediate layer 3 because the fire-retardant property can be further improved based on the synergistic effect with the molybdenum compound as described above.

In addition, when the intermediate layer 3 is the layer of (6), the intermediate layer 3 also exert good chemical resistance and corrosion resistance by the vinyl chloride resin having a chlorination degree of less than 58% and fire-retardant property of the intermediate layer 3 is also improved by the fire-retardant providing components, so that an antistatic resin plate having excellent fire-retardant property, chemical resistance and corrosion resistance is obtained. Similar to the case of the base layer, amount of the fire-retardant providing components in the intermediate layer should be controlled within the range of from 0.0005 to 10 parts by weight based on 100 parts by weight of the vinyl chloride resin. The reason for this was already described and therefore is omitted.

Since the intermediate layer 3 is employed to improve coating ability of the antistatic layer 2, its thickness is not particularly limited, but in order to keep fire-retardant property of the resin plate as a whole by reducing ratio of the intermediate layer occupying the whole resin plate, it is desirable to adjust thickness of the intermediate layer within the range of approximately from 30 to 500 µm, preferably from about 50 to 350 µm, excluding a case in which the intermediate layer is a layer of the vinyl chloride resin of (3) having a chlorination degree of less than 58%, and when the intermediate layer is the layer of (3), it is desirable to form it into an approximate thickness of 200 µm or less, preferably from 25 to 150 µm, so that fire-retardant property of the whole resin plate is not substantially reduced as already described.

It goes without saying that the intermediate layer 3 is also optionally blended with various additives necessary for molding, such as a stabilizer (e.g., a tin based stabilizer when transparent intermediate layer 3 is desired), a lubricant, a processing aid and a reinforcing agent.

Since the intermediate layer 3 is employed to improve coating ability of the antistatic layer 2, in order to obtain uniform antistatic property (surface resistivity) of the resin plate as a whole by coating the intermediate layer in a uniform thickness, a film having good surface smoothness, such as an extrusion film, a calender film or an inflation film, is suitably used. Regarding the smoothness, it is, e.g., 5 µm or less when calculated by a ten point measuring method based on JIS B-8741.

The base layer 1 and intermediate layer 3 can be selected in various combinations. Particularly, as a combination suitable for obtaining an opaque antistatic resin plate, it is desirable to prepare the base layer 1 from a vinyl chloride resin composition containing a titanium compound and use the intermediate layer 3 from the titanium compound-containing layer of (1), the high chlorination degree vinyl chloride resin layer of (2) or the thin, low chlorination degree vinyl chloride resin layer of (3), particularly (1) or (2), for increasing fire-retardant property. Also, as a combination suitable for obtaining a transparent antistatic resin plate, it is desirable to prepare the base layer 1 from a vinyl chloride resin composition having a chlorination degree of from 58 to 73% (preferably, an after-chlorinated vinyl chloride resin having a chlorination degree of from 60 to 67%) and use the intermediate layer 3 from the high chlorination degree vinyl chloride resin layer of (2) or the thin, low chlorination degree vinyl chloride resin layer of (3), for improving both fire-retardant property and transparency.

The antistatic resin plate in which the intermediate layer 3 is arranged between the base layer 1 and antistatic layer 2 can be produced, e.g., by the following method.

Firstly, a vinyl chloride resin having a chlorination degree of less than 58% or from 58 to 73% is selectively mixed with titanium oxide, a phosphorus fire-retarding agent, a chlorinated polyethylene, a molybdenum compound, fire-retardant providing components and various additives so as to prepare a vinyl chloride resin composition which is used in the formation of any one of the intermediate layers of (1) to (6). Then, the antistatic layer-forming coating solution is coated on the surface of an extrusion film, a calender film or an inflation film prepared from this composition, and the film is dried to prepare a film in which the antistatic layer 2 is formed on its one side. Thereafter, an antistatic resin plate in which the intermediate layer 3 is arranged between the base layer 1 and antistatic layer 2 is produced by (1) laminating and pressing two or more calender sheets or extrusion plates prepared from the vinyl chloride resin composition for base layer forming use and the film for intermediate layer forming use in which the antistatic layer 2 is formed on its one side, or (2) by laminating the film for intermediate layer forming use in which the antistatic layer 2 is formed on its one side, on at least one side of an extrusion plate during its melt-extrusion molding from the vinyl chloride resin composition for base layer forming use.

The molding having a plate shape such as the antistatic resin plate can be easily prepared by laminating the base layer 1, the intermediate layer 3, and the antistatic layer 2 by the conventional method such as hot-pressing, extrusion laminating, etc. When the antistatic layer 2 is formed on the surface of an extrusion film, a calender film or an inflation film for use in the formation of intermediate layer and then pressed or laminated in this manner, the antistatic layer 2 can be formed uniformly and thinly so that improvement of the antistatic property can be achieved.

Next, more illustrative examples of the invention are described.

INVENTIVE EXAMPLE 1

A basal formulation composition A (chlorination degree: about 56%, a lead based stabilizer was used) was prepared by uniformly mixing 100 parts by weight of a commercially available vinyl chloride resin having a chlorination degree of about 56% with 4 parts by weight of a lead based stabilizer, 2 parts by weight of a lubricant and 4 parts by weight of a processing aid. By mixing 110 parts by weight of this basal formulation composition A with 25 parts by weight of titanium oxide powder surface-coated with alumina (average particle size: 0.2 µm or less) as a titanium compound, a composition for base layer use was prepared, a calender sheet of 0.5 mm in thickness was prepared using this composition and then a plate of 3 mm in thickness was prepared by superposing and hot-pressing 6 pieces of the calender sheet.

Separately, using a vinyl chloride resin having a chlorination degree of about 56% as a binder resin, a coating solution for antistatic layer formation use was prepared by uniformly mixing and dispersing the resin component and an antimony-containing tin oxide as a conductive material at a weight ratio of 1 to 2. Thereafter, a whitish-opaque antistatic resin plate of two layer structure composed of 3 mm in thickness of a base layer and 0.4 µm in thickness of an antistatic resin layer was prepared by coating and drying this coating solution on the surface of the above plate and thereby forming the antistatic layer.

The thus obtained antistatic resin plate was cut into a size of 50×50 mm to prepare a test piece, and the test piece was put into an electric furnace heated at 800° C. to carry out a fire-retardant property test for examining the presence or absence of ignition and the period until ignition. The results are shown in the following Table 1.

Also, surface resistivity of the test piece was measured in accordance with JIS K-6911, with the result also shown in the following Table 1.

INVENTIVE EXAMPLE 2

A basal formulation composition B (chlorination degree: about 64%, a tin based stabilizer was used) was prepared by uniformly mixing 100 parts by weight of an after-chlorinated vinyl chloride resin having a chlorination degree of about 64% with 4 parts by weight of a dibutyltin malate based stabilizer, 2 parts by weight of a lubricant, 1 part by weight of a processing aid and 5 parts by weight of an MBS type reinforcing agent. A calender sheet of 0.5 mm in thickness was prepared using this basal formulation composition B, and a plate of 3 mm in thickness was prepared by superposing and hot-pressing 6 pieces of this calender sheet.

A colorless and transparent antistatic resin plate of two layer structure composed of 3 mm in thickness of a base layer and 0.4 μm in thickness of an antistatic layer was prepared by coating and drying the coating solution for antistatic layer formation use prepared in Inventive Example 1 on the surface of this plate and thereby forming the antistatic layer.

Test pieces prepared by cutting the thus obtained antistatic resin plate into a size of 50×50 mm were subjected to the test of fire-retardant property and surface resistivity measurement in the same manner as described in Inventive Example 1, with the results shown in the following Table 1. Also, total light transmittance and haze value of the test pieces were measured in accordance with JIS K-6745, with the result also shown in the following Table 1.

INVENTIVE EXAMPLES 3 to 6

A basal formulation composition C (chlorination degree: about 56%, a tin based stabilizer was used) was prepared by uniformly mixing 100 parts by weight of a general vinyl chloride resin having a chlorination degree of about 56% with 4 parts by weight of a dibutyltin malate based stabilizer, 1 part by weight of a lubricant, 1 part by weight of a processing aid and 5 parts by weight of an MBS type reinforcing agent. By selectively mixing 111 parts by weight of this basal formulation composition C, tricresyl phosphate as a phosphorus fire-retarding agent, a chlorinated polyethylene having a chlorination degree of 30%, molybdenum oxide as a molybdenum compound and zinc stearate as a decomposition accelerator agent, at respective ratios shown in the following Table 1, compositions for use in 4 base layers having different compositions were prepared. Using these compositions for base layer use, respective calender sheets of 0.5 mm in thickness were prepared and then 4 types of plate of 3 mm in thickness were prepared by superposing and hot-pressing 6 pieces of each of the calender sheets.

Three different colorless and transparent antistatic resin plates (Inventive Examples 3, 4 and 6) and an opaque antistatic resin plate (Inventive Example 5) each having a two layer structure composed of 3 mm in thickness of a base layer and 0.4 μm in thickness of an antistatic layer were prepared by coating and drying the coating solution for antistatic layer formation use prepared in Inventive Example 1 on the surface of these plate bodies and thereby forming respective antistatic layers.

Test pieces prepared by cutting each of the thus obtained antistatic resin plates into a size of 50×50 mm were subjected to the test of fire-retardant property and surface resistivity measurement in the same manner as described in Inventive Example 1, and their total light transmittance and haze value were also measured in the same manner as described in Inventive Example 2, with the results shown in the following Table 1.

Comparative Example 1

A calender sheet having a thickness of 0.5 mm was prepared using the basal formulation composition C (chlorination degree: about 56%, a tin based stabilizer was used) prepared in Inventive Examples 3 to 6. A plate of 3 mm in thickness was prepared by superposing and hot-pressing 6 pieces of the calender sheet. Thereafter, a colorless and transparent antistatic resin plate of a two layer structure composed of 3 mm in thickness of a base layer and 0.4 μm in thickness of an antistatic layer was prepared by coating and drying the coating solution for antistatic layer formation use prepared in Inventive Example 1 on the surface of this plate and thereby forming the antistatic layer of 0.4 μm in thickness.

The thus obtained antistatic resin plate was cut into a size of 50×50 mm to prepare test pieces, their fire-retardant property and surface resistivity were tested and measured in the same manner as described in Inventive Example 1, and their total light transmittance and haze value were also measured in the same manner as described in Inventive Example 2, with the results shown in the following Table 1.

TABLE 1

| | Inventive Example | | | | | | Comparative Example |
| --- | --- | --- | --- | --- | --- | --- | --- |
| | 1 Base layer | 2 Base layer | 3 Base layer | 4 Base layer | 5 Base layer | 6 Base layer | 1 Base layer |
| Composition (parts by weight) | | | | | | | |
| Basal formulation composition A*1 | 110 | — | — | — | — | — | — |
| Basal formulation composition B*2 | — | 112 | — | — | — | — | — |
| Basal formulation composition C*3 | — | — | 111 | 111 | 111 | 111 | 111 |
| Titanium compound (titanium oxide) | 25 | — | — | — | — | — | — |
| Phosphorus fire-retarding agent (tricresyl phosphate) | — | — | 5 | — | — | — | — |
| Chlorinated polyethylene | — | — | — | 7 | — | — | — |

TABLE 1-continued

|  | Inventive Example | | | | | | Comparative Example |
|---|---|---|---|---|---|---|---|
|  | 1 Base layer | 2 Base layer | 3 Base layer | 4 Base layer | 5 Base layer | 6 Base layer | 1 Base layer |
| Molybdenum compound (molybdenum oxide) | — | — | — | — | 1 | — | — |
| Decomposition accelerator agent (zinc stearate) | — | — | — | — | — | 0.2 | — |
| Fire-retardant test | | | | | | | |
| Presence of ignition | no | no | no | no | no | no | yes |
| Ignition time (second) | — | — | — | — | — | — | 20 |
| Surface resistivity($\Omega$/□) | $10^6$ | $10^6$ | $10^6$ | $10^6$ | $10^6$ | $10^6$ | $10^6$ |
| Transparency | | | | | | | |
| Total light transmittance (%) | opaque | 68 | 77 | 60 | opaque | 75 | 78 |
| Haze value (%) | opaque | 3.5 | 2.2 | 10.5 | opaque | 3.0 | 7.5 |

*1: Chlorination degree 56%, lead based stabilizer used
*2: Chlorination degree 64%, tin based stabilizer used
*3: Chlorination degree 56%, tin based stabilizer used According to this Table 1, since the antistatic layer in which antimony-containing tin oxide is dispersed is formed on one side of the base layer of each of the antistatic resin plates of Inventive Examples 1 to 6 and the antistatic resin plate of Comparative Example 1, they have good antistatic property with a small surface resistivity of $10^6$ $\Omega$/□.

However, since the base layer of the antistatic resin plate of Comparative Example 1 was formed from a basal formulation composition C having a general vinyl chloride resin having a chlorination degree of about 56% and did not contain a titanium compound, a phosphorus fire-retarding agent, a chlorinated polyethylene, a molybdenum compound, and a fire-retardant providing component such as a decomposition accelerator agent, it ignited after 20 seconds as a result of the fire-retardant test due to its poor fire-retardant property.

On the contrary, even in the case of the base layer formed from the basal formulation composition A or C which used the general vinyl chloride resin having a chlorination degree of about 56%, the antistatic resin plates of Inventive Examples 1, 3, 4, 5 and 6 in which a titanium compound, a phosphorus fire-retarding agent, a chlorinated polyethylene, a molybdenum compound or a decomposition accelerator agent was contained in the base layer did not ignite by the fire-retardant test, thus showing excellent fire-retardant property.

Also, though the antistatic resin plates of Inventive Examples 1 which used titanium oxide and Inventive Example 5 which used a molybdenum compound were opaque, the antistatic resin plates of Inventive Examples 2, 3, 4 and 6 which did not use titanium oxide but used a tin based stabilizer were good in transparency with a total light transmittance of 60% or more and a haze value of approximately 10% or less and, particularly, among the antistatic resin plates of Inventive Examples 3, 4 and 6 which used the general vinyl chloride resin having a chlorination degree of about 56%, the antistatic resin plates of Inventive Examples 3 and 6 were superior to that of Inventive Example 4 in terms of both of their total light transmittance and haze value, thus showing that the phosphorus fire-retarding agent or decomposition accelerator agent is desirable in obtaining a transparent antistatic resin plate. Also, it is evident that the antistatic resin plates of Inventive Examples 3, 4 and 6 which used a vinyl chloride resin having a chlorination degree of about 56% are excellent in transparency in comparison with the antistatic resin plate of Inventive Example 2 which used an after-chlorinated vinyl chloride resin having a chlorination degree of about 64%.

INVENTIVE EXAMPLE 7

A calender sheet for base layer use having a thickness of 0.5 mm was prepared using the composition for basal layer use prepared in Inventive Example 1 (prepared by mixing 110 parts by weight of the basal formulation composition A with 25 parts by weight of titanium oxide).

Separately, a basal formulation composition A' was prepared by increasing amount of the lubricant contained in the basal formulation composition A of Inventive Example 1 from 2 parts by weight to 4 parts by weight, and a composition for intermediate layer use was prepared by mixing 112 parts by weight of the basal formulation composition A' with 4 parts by weight of titanium oxide. Subsequently, a calender film for intermediate layer use having a thickness of 300 μm was prepared using this composition for intermediate layer use, and an antistatic layer of 0.4 μm in thickness was formed by coating and drying the coating solution for antistatic layer formation use prepared in Inventive Example 1 on the surface of one side of this calender film for intermediate layer use.

Next, a whitish-opaque antistatic resin plate of a three layer structure composed of 3 mm in thickness of a base layer, 300 μm in thickness of an intermediate layer and 0.4 μm in thickness of an antistatic layer was prepared by superposing and hot-pressing the antistatic layer-formed calender film for intermediate layer use on the superposed 6 pieces calender sheets for base layer use.

Test pieces were prepared by cutting the thus obtained antistatic resin plate into a size of 50×50 mm, fire-retardant property and surface resistivity were tested and measured in the same manner as described in Inventive Example 1, with the result shown in the following Table 2.

INVENTIVE EXAMPLE 8

A calender sheet for base layer use having a thickness of 0.5 mm was prepared using the composition for basal layer use prepared in Inventive Example 1. Separately, a basal formulation composition D (chlorination degree: about 64%, a lead based stabilizer was used) was prepared by uniformly mixing 100 parts by weight of an after-chlorinated vinyl chloride resin having a chlorination degree of about 64% with 8 parts by weight of a lead based stabilizer, 1 part by weight of a lubricant and 1 part by weight of a processing aid, a calender film for intermediate layer use having a thickness of 300 μm was prepared using this composition D. Then, an antistatic layer of 0.4 μm in thickness was formed by coating and drying the coating solution for antistatic layer formation use prepared in Inventive Example 1 on the surface of one side of this calender film for intermediate layer use.

A whitish-opaque antistatic resin plate of a three layer structure composed of 3 mm in thickness of a base layer, 300 μm in thickness of an intermediate layer and 0.4 μm in thickness of an antistatic layer was prepared by superposing and hot-pressing the antistatic layer-formed calender film for intermediate layer use on the 6 pieces-superposed calender sheet for base layer use.

Test pieces were prepared by cutting the thus obtained antistatic resin plate into a size of 50×50 mm, fire-retardant property and surface resistivity were tested and measured in the same manner as described in Inventive Example 1, with the result shown in the following Table 2.

INVENTIVE EXAMPLE 9

A calender sheet for base layer use having a thickness of 0.5 mm was prepared using the basal formulation composition B prepared in Inventive Example 2 (chlorination degree: about 64%, a tin based stabilizer was used), and a calender film for intermediate layer use having a thickness of 100 μm was prepared using the basal formulation composition C prepared in Inventive Examples 3 to 6 (chlorination degree: about 56%, a tin based stabilizer was used) to form an antistatic layer of 0.4 μm in thickness by coating and drying the coating solution for antistatic layer formation use prepared in Inventive Example 1 on the surface of one side of this calender film.

A colorless and transparent antistatic resin plate composed of 3 mm in thickness of a base layer, 100 μm in thickness of an intermediate layer and 0.4 μm in thickness of an antistatic layer was prepared by superposing and hot-pressing the antistatic layer-formed calender film for intermediate layer on the superposed 6 pieces calender sheets for base layer use.

Test pieces were prepared by cutting the thus obtained antistatic resin plate into a size of 50×50 mm, fire-retardant property and surface resistivity were tested and measured in the same manner as described in Inventive Example 1, and their total light transmittance and haze value were also measured in the same manner as described in Inventive Example 2, with the result shown in the following Table 2.

INVENTIVE EXAMPLE 10

A calender sheet for base layer use having a thickness of 0.5 mm was prepared using the basal formulation composition B prepared in Inventive Example 2 (chlorination degree: about 64%, a tin based stabilizer was used). Separately, a basal formulation composition B' (chlorination degree: about 64%, a tin based stabilizer was used) was prepared by increasing amount of the lubricant contained in the basal formulation composition B of Inventive Example 2 from 2 parts by weight to 3 parts by weight, and a calender film for intermediate layer use having a thickness of 300 μm was prepared using this composition B'. Thereafter, an antistatic layer of 0.4 μm in thickness was formed by coating and drying the coating solution for antistatic layer formation use prepared in Inventive Example 1 on the surface of one side of this calender film.

A colorless and transparent antistatic resin plate composed of 3 mm in thickness of a base layer, 300 μm in thickness of an intermediate layer and 0.4 μm in thickness of an antistatic layer was prepared by superposing 6 pieces of the calender sheet for base layer use and then superposing and hot-pressing the antistatic layer-formed calender film for intermediate layer use thereon.

Test pieces were prepared by cutting the thus obtained antistatic resin plate into a size of 50×50 mm, fire-retardant property and surface resistivity were tested and measured in the same manner as described in Inventive Example 1, and their total light transmittance and haze value were also measured in the same manner as described in Inventive Example 2, with the result shown in the following Table 2.

INVENTIVE EXAMPLE 11

A calender sheet for base layer use having a thickness of 0.5 mm was prepared using the basal formulation composition B prepared in Inventive Example 2 (chlorination degree: about 64%, a tin based stabilizer was used). Separately, a basal formulation composition C' (chlorination degree: about 56%, a tin based stabilizer was used) was prepared by increasing amount of the lubricant contained in the basal formulation composition C of Inventive Examples 3 to 6 from 1 part by weight to 2 parts by weight, and an intermediate layer composition was prepared by uniformly mixing 112 parts by weight of the composition C' with 5 parts by weight of tricresyl phosphate as a phosphorus fire-retarding agent. A calender film for intermediate layer use having a thickness of 300 μm was prepared using this intermediate layer composition, and an antistatic layer of 0.4 μm in thickness was formed by coating and drying the coating solution for antistatic layer formation use prepared in Inventive Example 1 on the surface of one side of this calender film.

A colorless and transparent antistatic resin plate composed of 3 mm in thickness of a base layer, 300 μm in thickness of an intermediate layer and 0.4 μm in thickness of an antistatic layer was prepared by superposing and hot-pressing the antistatic layer-formed calender film for intermediate layer use on the superposed 6 pieces calender sheets for base layer use.

Test pieces were prepared by cutting the thus obtained antistatic resin plate into a size of 50×50 mm, fire-retardant property and surface resistivity were tested and measured in the same manner as described in Inventive Example 1, and their total light transmittance and haze value were also measured in the same manner as described in Inventive Example 2, with the result shown in the following Table 2.

INVENTIVE EXAMPLE 12

A base layer composition was prepared by uniformly mixing the basal formulation composition B prepared in Inventive Example 2 (chlorination degree: about 64%, a tin based stabilizer was used) with 5 parts by weight of titanium oxide as a titanium compound, and a calender sheet for base layer use having a thickness of 0.5 mm was prepared using this composition. Separately, an intermediate layer composition was prepared by uniformly mixing 1.0 part by weight of molybdenum oxide as a molybdenum compound in 112 parts by weight of the basal formulation composition C' (chlorination degree: about 56%, a tin based stabilizer was used) prepared in Inventive Example 11, a calender film for intermediate layer use having a thickness of 300 μm was prepared using this composition, and then an antistatic layer of 0.4 μm in thickness was formed by coating and drying the coating solution for antistatic layer formation use prepared in Inventive Example 1 on the surface of one side of this calender film.

Thereafter, an opaque antistatic resin plate composed of 3 mm in thickness of a base layer, 300 μm in thickness of an intermediate layer and 0.4 μm in thickness of an antistatic layer was prepared by superposing and hot-pressing the antistatic layer-formed calender film for intermediate layer use on the superposed 6 pieces calender sheets for base layer use.

Test pieces were prepared by cutting the thus obtained antistatic resin plate into a size of 50×50 mm to test and measure fire-retardant property and surface resistivity in the same manner as described in Inventive Example 1, with the result shown in the following Table 2.

INVENTIVE EXAMPLE 13

A base layer composition was prepared by uniformly mixing 111 parts by weight of the basal formulation composition C prepared in Inventive Examples 3 to 6 (chlorination degree: about 56%, a tin based stabilizer was used) with 5 parts by weight of tricresyl phosphate as a phosphorus fire-retarding agent, and a calender sheet for base layer use having a thickness of 0.5 mm was prepared using this composition. Separately, an intermediate layer composition was prepared by uniformly mixing 112 parts by weight of the basal formulation composition C' (chlorination degree: about 56%, a tin based stabilizer was used) prepared in Inventive Example 11 with 0.2 part by weight of zinc stearate as a decomposition accelerator agent, a calender film for intermediate layer use having a thickness of 300 μm was prepared using this composition, and then an antistatic layer of 0.4 μm in thickness was formed by coating and drying the coating solution for antistatic layer formation use prepared in Inventive Example 1 on the surface of one side of this calender film.

Thereafter a colorless and transparent antistatic resin plate composed of 3 mm in thickness of a base layer, 300 μm in thickness of an intermediate layer and 0.4 μm in thickness of an antistatic layer was prepared by superposing and hot-pressing the antistatic layer-formed calender film for intermediate layer use on the superposed 6 pieces calender sheets for base layer use.

Test pieces were prepared by cutting the thus obtained antistatic resin plate into a size of 50×50 mm, fire-retardant property and surface resistivity were tested and measured in the same manner as described in Inventive Example 1, and their total light transmittance and haze value were also measured in the same manner as described in Inventive Example 2, with the result shown in the following Table 2.

INVENTIVE EXAMPLE 14

A colorless and transparent antistatic resin plate was prepared by superposing and hot-pressing 6 pieces of the calender sheet for base layer use and 1 piece of the calender film for intermediate layer use both prepared in Inventive Example 10.

Next, a transparent antistatic resin plate of a three layer structure composed of 3 mm in thickness of a base layer, 300 μm in thickness of an intermediate layer and 3 μm in thickness of an antistatic layer was obtained by preparing a coating solution for antistatic layer formation use in which an ultraviolet curing acrylic resin was used as a binder resin and the resin component and antimony-containing tin oxide as a conductive material were uniformly mixed and dispersed at a weight ratio of 1 to 2, coating this coating solution on the surface of the calender film for intermediate layer use of the laminated plate and then forming the antistatic layer by curing the coated layer with ultraviolet ray.

Test pieces were prepared by cutting the thus obtained antistatic resin plate into a size of 50×50 mm, fire-retardant property and surface resistivity were tested and measured in the same manner as described in Inventive Example 1, and their total light transmittance and haze value were also measured in the same manner as described in Inventive Example 2, with the result shown in the following Table 2.

INVENTIVE EXAMPLE 15

The calender sheet for base layer use having a thickness of 0.5 mm and calender film for intermediate layer use having a thickness of 300 μm both obtained in Inventive Example 10 were prepared.

Separately, a coating solution for antistatic layer formation use was prepared using a vinyl chloride resin having a chlorination degree of about 56% as a binder resin and uniformly mixing and dispersing the resin component and graphite fibers (fiber diameter 10 to 50 nm, fiber length 10 to 20 μm) used as a conductive material at a weight ratio of 1 to 0.04, and the antistatic layer forming coating solution is coated on the surface of the calender film and the film is dried so that an antistatic layer is 0.2 μm in thickness.

A colorless and transparent antistatic resin plate having a three layer structure composed of 3 mm in thickness of a base layer, 300 μm in thickness of an intermediate layer and 0.2 μm in thickness of an antistatic layer was prepared by superposing and hot-pressing the antistatic layer-formed calender film for intermediate layer use on the superposed 6 pieces calender sheets for base layer use.

Test pieces were prepared by cutting the thus obtained antistatic resin plate into a size of 50×50 mm, fire-retardant property and surface resistivity were tested and measured in the same manner as described in Inventive Example 1, and their total light transmittance and haze value were also measured in the same manner as described in Inventive Example 2, with the result shown in the following Table 2.

TABLE 2

| | Inventive Example *1 | | | | | | | | | | | | | | | | | |
|---|---|---|---|---|---|---|---|---|---|---|---|---|---|---|---|---|---|---|
| | 7 | | 8 | | 9 | | 10 | | 11 | | 12 | | 13 | | 14 | | 15 | |
| | IL | BL | IL | BL | IL | BL | IL | BL | IL | BL | IL | BL | IL | BL | IL | BL | IL | BL |
| Composition (parts by weight)*2 | | | | | | | | | | | | | | | | | | |
| Basal formulation composition A | — | 110 | — | 110 | — | — | — | — | — | — | — | — | — | — | — | — | — | — |
| Basal formulation composition A' | 112 | — | — | — | — | — | — | — | — | — | — | — | — | — | — | — | — | — |
| Basal formulation composition B | — | — | — | — | 112 | — | 112 | — | 112 | — | 112 | — | — | — | 112 | — | — | 112 |
| Basal formulation composition B' | — | — | — | — | — | 113 | — | — | — | — | — | — | — | — | — | 113 | 113 | — |
| Basal formulation composition C | — | — | — | — | — | — | — | — | — | — | — | — | — | 111 | — | — | — | — |
| Basal formulation composition C' | — | — | — | — | — | — | — | — | — | 112 | — | 112 | 112 | — | — | — | — | — |
| Basal formulation composition D | — | — | — | — | — | — | — | 110 | — | — | — | — | — | — | — | — | — | — |
| Titanium compound ($TiO_2$) | 4 | 25 | — | 25 | — | — | — | — | — | — | — | — | — | 5 | — | — | — | — |
| Phosphorus fire-retarding agent (tricresyl phosphate) | — | — | — | — | — | — | — | — | — | 5 | — | — | — | — | 5 | — | — | — |
| Molybdenum compound ($MoO_3$) | — | — | — | — | — | — | — | — | — | — | — | 1 | — | — | — | — | — | — |
| Decomposition accelerator agent (zinc stearate) | — | — | — | — | — | — | — | — | — | — | — | — | — | 0.2 | — | — | — | — |
| Fire-retardant property test | | | | | | | | | | | | | | | | | | |
| Presence of ignition | no | | no | | no | | no | | no | | no | | no | | no | | no | |
| Ignition time (seconds) | — | | — | | — | | — | | — | | — | | — | | — | | — | |
| Surface resistivity ($\Omega/\square$) | $10^6$ | | $10^6$ | | $10^6$ | | $10^6$ | | $10^6$ | | $10^6$ | | $10^6$ | | $10^6$*3 | | $10^6$*4 | |
| Transparency | | | | | | | | | | | | | | | | | | |
| Total light transmittance (%) | opaque | | opaque | | 65 | | 63 | | 65 | | opaque | | 73 | | 62 | | 66 | |
| Haze value (%) | opaque | | opaque | | 7.5 | | 8.0 | | 7.8 | | opaque | | 3.3 | | 8.3 | | 3.6 | |

*1: IL, intermediate layer, B, L, base layer
*2: Compositions A and A', chlorination degree 56%, a lead based stabilizer was used; compositions B and B', chlorination degree 64%, a tin based stabilizer was used; compositions C and C', chlorination degree 56%, a tin based stabilizer was used; composition D, chlorination degree 64%, a lead based stabilizer was used
*3: A UV curing antistatic layer
*4: An antistatic layer containing graphite fiber According to this Table 2, each of the antistatic resin plates of Inventive Examples 7 to 14 in which an antistatic layer containing antimony-containing tin oxide was formed showed good antistatic property with a small surface resistivity of $10^6$ $\Omega/\square$, and the antistatic resin plate of Inventive Example 15 in which an antistatic layer containing graphite fiber was formed showed a surface resistivity of $10^6$ $\Omega/\square$ which is similar to the case of the antistatic resin plates of Inventive Examples 7 to 14, despite the extremely small graphite fiber content. It can be understood from this result that graphite fiber can exert good antistatic effect with a small amount and therefore is useful as a conductive material.

Also, all of the antistatic resin plates of Inventive Examples 7 to 15 showed excellent fire-retardant property without causing ignition by the fire-retardant property test, and though the base layer in the antistatic resin plate of Inventive Example 7, 8, or 13 was formed from the basal formulation composition or the intermediate formulation composition A, A', C or C' which used a general vinyl chloride resin of not so good fire-retardant property having a chlorination degree of about 56%, their fire-retardant property was improved because of the use of a titanium compound, a phosphorus fire-retarding agent, a molybdenum compound or a decomposition accelerator agent.

Also, though a general vinyl chloride resin having a chlorination degree of about 56% was used as the intermediate layer in the antistatic resin plate of Inventive Example 9, it showed fire-retardant property due to reduced ratio of the layer occupying the whole resin plate by thinning its thickness to 100 μm, and though the intermediate layers of the antistatic resin plates of Inventive Examples 10, 14 and 15 were relatively thick, namely 300 μm, the antistatic resin plates showed fire-retardant property due to the use of a chlorinated vinyl chloride resin having a chlorination degree of 64%.

In addition, though the antistatic resin plates of Inventive Examples 7 and 8 which used a lead based stabilizer and the antistatic resin plates of Inventive Example 12 which used a tin based stabilizer but contained a titanium compound were opaque, all of the antistatic resin plates of Inventive Examples 9, 10, 11, 13, 14 and 15 which used a tin based stabilizer but did not contain a titanium compound and a molybdenum compound were good in transparency with a total light transmittance of 62% or more and a haze value of 8.3% or less. Particularly, the antistatic resin plate of Inventive Example 13 in which its base layer and intermediate layer were formed from the basal formulation compositions C and C' which used a general vinyl chloride resin having a chlorination degree of about 56% and contained a phosphorus fire-retarding agent and a decomposition accelerator agent was far superior to other counterparts in terms of transparency with the total light transmittance of 73% and the haze value of 3.3%, thus showing that a vinyl chloride resin having a chlorination degree of about 56%, a phosphorus fire-retarding agent and a decomposition accelerator agent are desirable in obtaining a transparent antistatic resin plate.

In addition, even in the Example 14 which used an antistatic layer having an ultraviolet curing acrylic resin as a binder, it was possible to obtain the fire-retardant property and transparency which are similar to those of other Examples using a vinyl chloride resin as a binder.

As can be seen from the above descriptions and experimental data, the antistatic vinyl chloride resin moldings of the invention exert excellent effects such as markedly improved fire-retardant property, good chemical resistance and corrosion resistance and less deterioration, reliable ability to prevent adhesion of dust when charged and good transparency when a titanium compound is not contained in the base layer or intermediate layer.

While the invention has been described in detail and with reference to specific embodiments thereof, it will be apparent to one skilled in the art that various changes and modifications can be made therein without departing from the spirit and scope thereof.

This application is based on Japanese patent application No. 2000-302849 filed Sep. 29, 2000, the entire contents thereof being hereby incorporated by reference.

What is claimed is:

1. A transparent, fire-retardant antistatic vinyl chloride resin molding, which comprises a base layer comprising a vinyl chloride resin, an intermediate layer and an antistatic layer both being laminated on both surfaces of said base layer,
wherein said base layer comprises a vinyl chloride resin having a chlorination degree of from 60 to 67% and free from any titanium compound and free from any fire-retarding agent, wherein the thickness of the base layer is from 1 to 15 mm, and
wherein the intermediate layer comprises a vinyl chloride resin having a chlorination degree of from 58 to 73% and free from any titanium compound and any fire-retarding agent, and has a composition different from that of the base layer, wherein the thickness of the intermediate layer is from 30 to 350 µm.

2. The antistatic vinyl chloride resin molding according to claim 1, wherein the antistatic layer comprises, as a binder resin, a vinyl chloride resin having a chlorination degree of from 58 to 73%, and a conductive material.

3. The antistatic vinyl chloride resin molding according to claim 1, wherein the antistatic layer comprises, as a binder resin, an ultraviolet curing or thermosetting resin, and a conductive material.

4. The antistatic vinyl chloride resin molding according to claim 2 or 3, wherein the conductive material is at least one of tin oxide, a conductive titanium oxide, and a twisting and entangling ultra thin long carbon fiber.

5. A transparent, fire-retardant antistatic vinyl chloride resin molding, which comprises a base layer comprising a vinyl chloride resin, an intermediate layer and an antistatic layer both being laminated on both sides of said base layer,
wherein said base layer comprises a vinyl chloride resin having a chlorination degree of from 60 to 67%, and a tin system heat stabilizer, and free from any titanium compound and any fire-retarding agent, wherein the thickness of the base layer is from 1 to 15 mm,
wherein the intermediate layer comprises a vinyl chloride resin having a chlorination degree of from 60 to 67% and free from any titanium compound and any fire-retarding agent, and has a composition different from that of the base layer, wherein the thicknesss of the intermediate layer is from 30 to 350 µm, and
wherein the antistatic surface layer comprises a conductive material comprising tin oxide containing antimony and the thickness of the antistatic layer is from 0.3 to 1.5 µm,
wherein the total light transmittance of the molding is from 60 to 85%, the haze value is from 1 to 10%, and the surface resistivity is $10^{10}$ Ω/□ or less.

6. A transparent, fire-retardant antistatic vinyl chloride resin molding, which comprises a base layer comprising a vinyl chloride resin, an intermediate layer and an antistatic layer both being laminated on both sides of said base layer,
wherein said base layer comprises a vinyl chloride resin having a chlorination degree of 60 to 67%, and a tin system heat stabilizer, and free from any titanium compound and any fire-retarding agent, wherein the thickness of the base layer is from 1 to 15 mm,
wherein the intermediate layer comprises a vinyl chloride resin having a chlorination degree of 60 to 67% and free from any titanium compound and any fire-retarding agent, and has a composition different from that of the base layer, wherein the thickness of the intermediate layer is from 50 to 350 µm, and
wherein the antistatic surface layer comprises a conductive material comprising a twisting and entangling ultra thin long carbon fiber and the thickness of the antistatic layer is from 0.1 to 1.0 µm, and
wherein the total light transmittance of the molding is from 60 to 85%, the haze value is from 1 to 10%, and the surface resistivity is $10^{10}$ Ω/□ or less.

7. A transparent, fire-retardant antistatic vinyl chloride resin molding, which comprises a base layer comprising a vinyl chloride resin, an intermediate layer and an antistatic layer both being laminated on both surfaces of said base layer,
wherein said base layer comprises a vinyl chloride resin having a chlorination degree of from 60 to 67% and free from any titanium compound and any fire-retarding agent, and wherein the thickness of the base layer is from 1 to 15 mm, and
wherein the intermediate layer comprises a vinyl chloride resin having a chlorination degree of from 60 to 67% and free from any titanium compound and any fire-retarding agent, and has a composition different from that of the base layer, wherein the thickness of the intermediate layer is from 30 to 350 µm,
wherein the total light transmittance of the molding is from 60 to 85% and the haze value is from 1 to 10%.

8. A transparent, fire-retardant antistatic vinyl chloride resin molding, which comprises a base layer comprising a vinyl chloride resin, an intermediate layer and an antistatic layer both being laminated on both surfaces of said base layer,
wherein said base layer comprises a vinyl chloride resin having a chlorination degree of from 60 to 67% and free from any titanium compound and any fire-retarding agent, and wherein the thickness of the base layer is from 1 to 15 mm, and
wherein the intermediate layer comprises a vinyl chloride resin having a chlorination degree of from 60 to 67% and free from any titanium compound and any fire-retarding agent, and has a composition different from that of the base layer, wherein the thickness of the intermediate layer is from 30 to 350 µm, wherein the total light transmittance of the molding is from 60 to 85% and the haze value is from 1 to 10%, and the surface resistivity is $10^{10}$ Ω/□ or less.

9. A transparent, fire-retardant antistatic vinyl chloride resin molding, obtained by superposing and hot-pressing a laminate film on plural calender sheets, wherein the laminate film is prepared by coating a coating solution containing a conductive material comprising a tin oxide containing antimony or an ultra fine conductive fiber on an intermediate film to form an antistatic layer, wherein the intermediate film has a thickness of from 30 to 350 μm, comprises a vinyl chloride resin having a chlorination degree of 60 to 67% and free from any titanium compound and any fire-retarding agent, and has a composition different from that of the calendar sheet, wherein the calendar sheet is produced by using a vinyl chloride resin having a chlorination degree of from 60 to 67% and free from any titanium compound and any fire-retarding agent, and wherein the total light transmittance of the molding is from 60 to 85%, the haze value is from 1 to 10%, and the surface resistivity is $10^{10}$ Ω/□ or less.

10. A transparent, fire-retardant antistatic vinyl chloride resin molding, obtained by laminating a laminate film on an extrusion plate, wherein the laminate film is prepared by coating a coating solution containing a conductive material comprising a tin oxide containing antimony or an ultra fine conductive fiber on an intermediate film to form an antistatic layer, wherein the intermediate film has a thickness of from 30 to 350 μm, comprises a vinyl chloride resin having a chlorination degree of from 60 to 67% and free from any titanium compound and any fire-retarding agent, and has a composition different from that of the extrusion plate, wherein the extrusion plate is formed by extruding a composition comprising a vinyl chloride resin having a chlorination degree of from 60 to 67% and free from any titanium compound and any fire-retarding agent, and wherein the total light transmittance of the molding is from 60 to 85%, the haze value is from 1 to 10%, and the surface resistivity is $10^{10}$ Ω/□ or less.

* * * * *